United States Patent [19]

Brunty

[11] 4,048,735
[45] Sept. 20, 1977

[54] MULTI-PURPOSE LABOR-SAVER WHEELED TOOL

[76] Inventor: Fred Brunty, Rte. 1, Box 403-140, Bluefield, W. Va. 24701

[21] Appl. No.: 654,860

[22] Filed: Feb. 3, 1976

[51] Int. Cl.² .................. E02H 5/02; B62D 51/04
[52] U.S. Cl. .................................... 37/130; 37/50;
37/53; 172/358; 280/47.24; 280/47.26; 294/51
[58] Field of Search ................. 37/130, 131, 53, 50,
37/46, 16, 40, 43 L, DIG. 3, 117.5; 280/47.13
R, 47.17, 47.18, 47.19, 47.2, 47.23, 47.24, 47.26,
64, 43.11, 43.14, 43; 294/51, 52, 54, 55, 59, 57;
172/329, 351, 358-364, 373, 375

[56] References Cited

U.S. PATENT DOCUMENTS

| 873,143 | 12/1907 | Wirt | 280/47.24 X |
|---|---|---|---|
| 1,045,392 | 11/1912 | Gravelle | 37/130 |
| 1,079,587 | 11/1913 | Anthony | 37/130 |
| 1,102,872 | 7/1914 | Cerney | 280/47.26 X |
| 2,476,526 | 7/1949 | Badlat | 37/50 X |
| 2,530,856 | 11/1950 | Callahan | 37/53 |
| 2,595,712 | 5/1952 | Shearer et al. | 294/51 X |
| 2,730,320 | 1/1956 | Srader | 280/47.24 X |
| 2,760,589 | 8/1956 | Rudman | 280/43 X |
| 2,786,541 | 3/1957 | Conrad | 280/43 X |
| 2,867,960 | 1/1959 | Stiles et al. | 280/43 X |
| 2,882,063 | 4/1959 | Strasel | 280/43 |
| 2,895,238 | 7/1959 | Long | 37/130 |
| 2,921,798 | 1/1960 | Cislak | 37/130 X |
| 3,086,789 | 4/1963 | Kleiman | 280/43 |
| 3,226,149 | 12/1965 | McJohnson | 294/51 X |
| 3,241,851 | 3/1966 | Dingbaum | 280/43 X |
| 3,242,598 | 3/1966 | Wright | 37/130 |
| 3,406,761 | 10/1968 | Ryan | 37/16 X |
| 3,735,831 | 5/1973 | Gray | 280/47.24 X |

FOREIGN PATENT DOCUMENTS

| 825,781 | 12/1959 | United Kingdom | 280/74.26 |
|---|---|---|---|
| 776,765 | 6/1957 | United Kingdom | 172/358 |

*Primary Examiner*—E. H. Eickholt

[57] ABSTRACT

A multi-purpose labor-saver wheeled tool having a frame which includes a pair of laterally spaced wheels adjustably mountable on stub axles in selected holes of respective vertical arrays of holes in paired side plates, a handle symmetrically extends rearwardly from a rearwardly-upwardly-sloped central plate joining the side plates; an upright front plate joins the side and central plates; the plate assembly forms a load-carrying region at the top, and all the individual plates have holes for attachment of co-acting accessory members, including both fixed-, and reel-and cable-pivotable blades for snow and ice removing, rakes, and scoops; hose-reel, squeegee, and brush embodiments are also provided.

14 Claims, 14 Drawing Figures

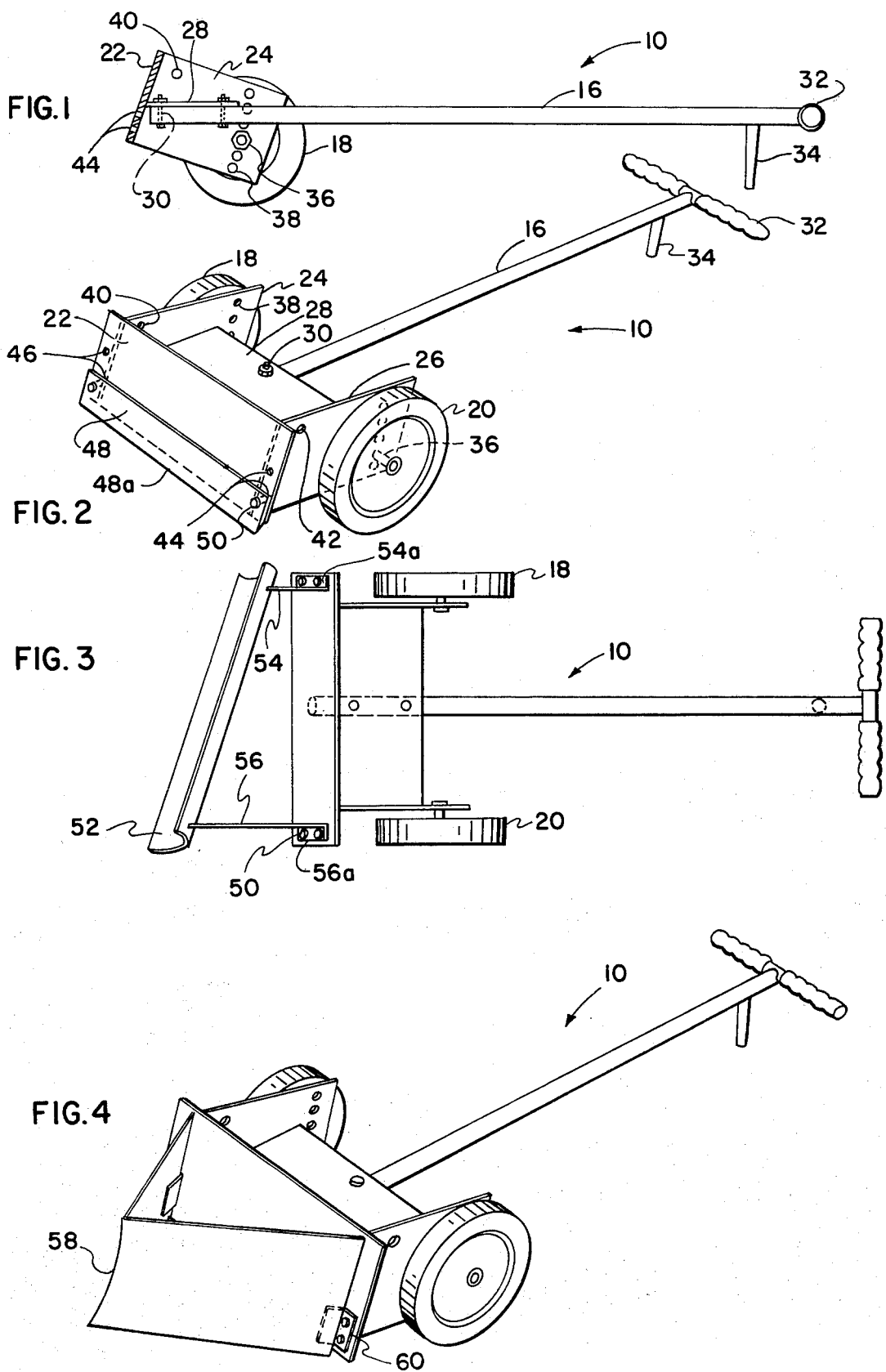

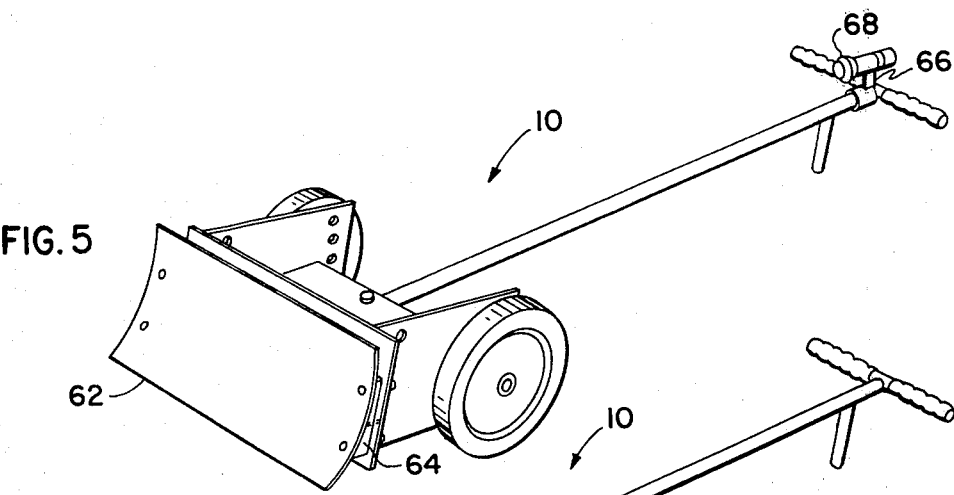
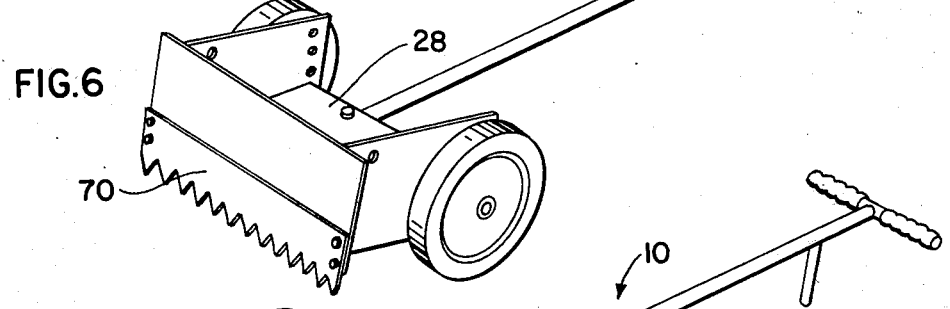
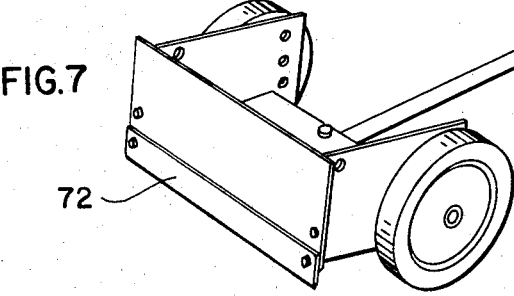
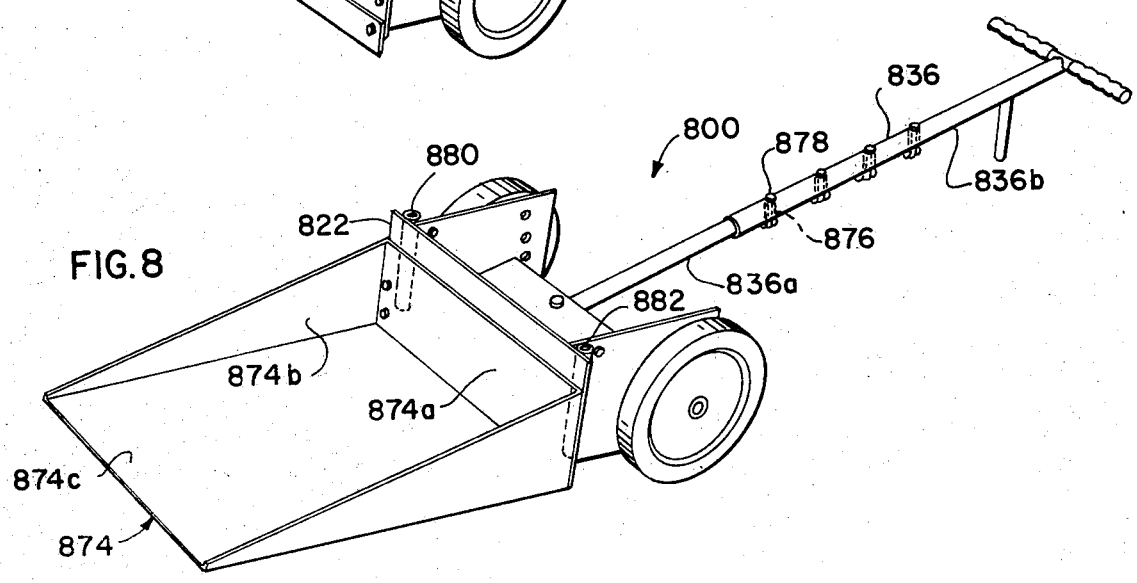

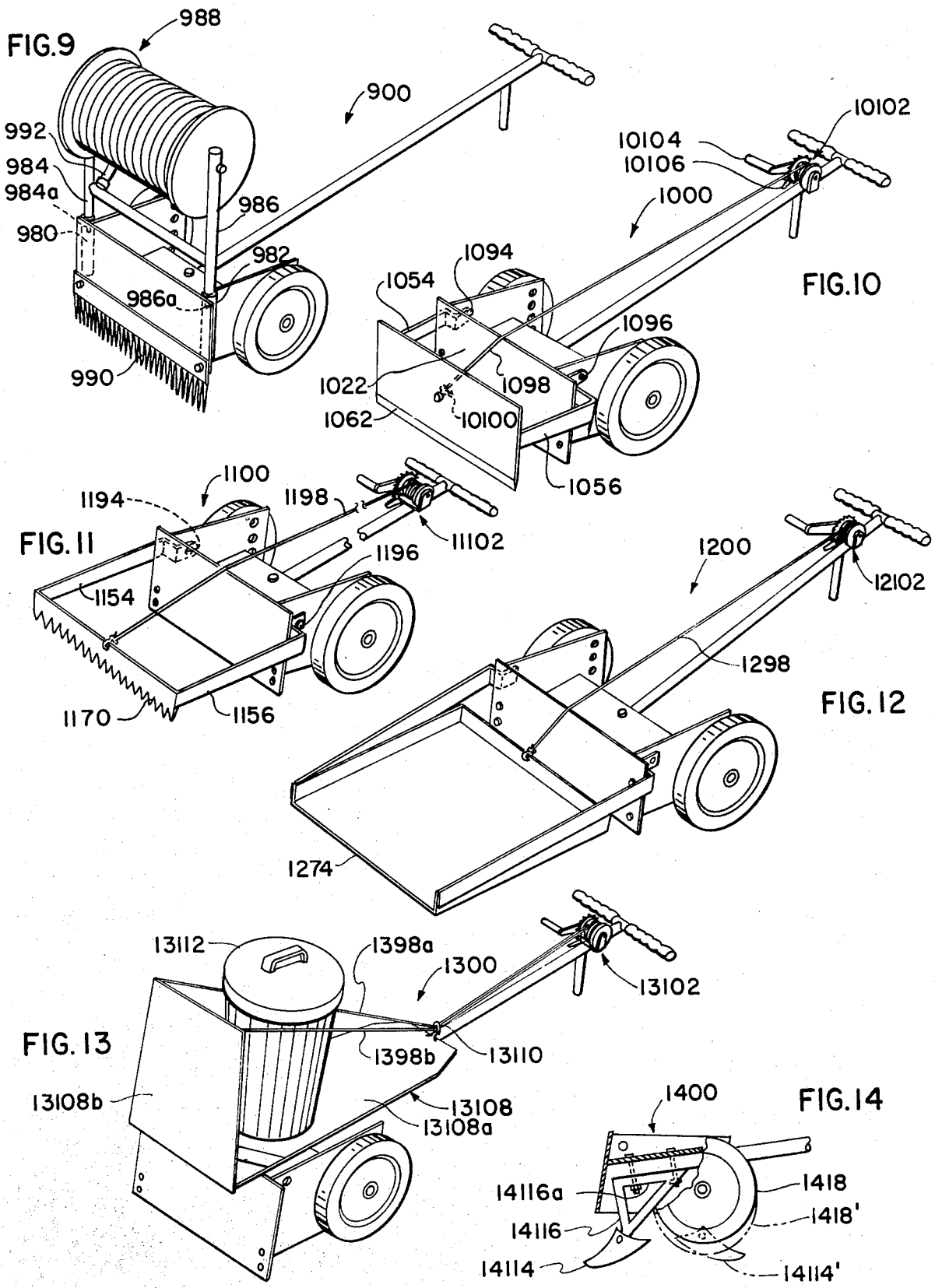

MULTI-PURPOSE LABOR-SAVER WHEELED TOOL

This invention relates generally to material handling and specifically to a multi-purpose wheeled tool having a plurality of adaptive accessories fitting it for various types of material handling.

In the prior art wheeled tools for purpose of moving and removing materials have been disclosed. As an example, the "Snow Removing Device" of U.S. Pat. No 2,508,612, granted May 23, 1950, to S. H. Kimbler, discloses a side-angled front-mounted blade on a two-wheel skeleton type frame with a push-handle. Further, the "Shovel Cart" of U.S. Pat. No. 2,932,103, granted to H. W. Wright on Apr. 12, 1930, discloses a two wheel upwardly inclined scoop with a scalloped edge and push-handle.

However, it is believed that the present invention with the multiple versatile attachments and arrangements disclosed below goes far beyond suggestions by the relatively specialized vehicles of the above Patents, and beyond any prior art disclosure by others.

A principle object of the invention is to provide a multi-purpose wheeled vehicle offering a versatile combination of labor and effort saving operations suited to many needs, in lightweight, rigid, quick-adjust, quick-change, economical embodiment. Another object is to provide a basic frame for the vehicle which requires a minimum of skill to expense in fabrication but provides exceptional strength and durability.

Further objects are to provide a vehicle as described to ease the workload in household, commercial, and industrial tasks requiring one-man snow clearance, ice removal, sand and other earth working, loosening, shaping and transport, water squee-geeing from sidewalks, cement floors, driveways, and the like, leaf and other debris clearing, garbage can and other container lifting and transport, and hose transport storage.

In brief summary given for purposes of cursive description only and not as limitation, the invention includes a frame including a fixedly mounted handle, adjustably mounting a laterally opposed set of wheels, and either fixedly or pivotally mounting, as desired, a family of related material-moving and carrying accessory members.

The above and other objects and advantages of the invention will become more apparent on examination of the following description, including drawings in which:

FIG. 1 is a side elevational view partly in section, of the frame of the invention;
FIG. 2 is an isometric view of an embodiment;
FIG. 3 is a plan view of an embodiment;
FIGS. 4 through 13 are isometric views of embodiments; and
FIG. 14 is a side elevational detail, partly in section of an embodiment.

In the Figures, like reference numerals refer to like parts.

FIG. 1 shows in partial section the frame 10, including a handle 16, a pair of wheels 18, 20 (not shown), and four flat plates as follows: a laterally elongate front plate 22 extending transversely across the frame, a first or right-hand side plate 24, substantially contiguous in height to the front plate and extending rearwardly from it, a second or left-hand side plate 26 (not shown) laterally spaced from the right-hand side plate and similarly mounted to the front plate, and center plate 28, which extends rearwardly and upwardly from the front plate and which extends along and connects a major portion of the length or rearward extent of the side plates. The center plate serves as both the top and bottom of the body. Preferably all the plates are welded together for strength and rigidity.

The handle is preferably a straight length of tubing, attached along the longitudinal centerline of the frame beneath the center plate by spaced bolts 30, and extending rearwardly to a crossbar grip 32, ahead of which a skid 34 extends downwardly a distance maintaining the handle horizontal when the skid rests on the ground.

Bolt-and-nut stub axles 36 attach wheels adjustably to the side plates at any of plural (preferably five) vertically spaced, matched, axle holes 38 provided for the purpose in the respective side plates rearwardly of the center plate where access is convenient to all from above trailing edge. Matched holes 40, 42 (not shown) through the side plates forward of the wheels and above the center plate provide for pivotal attachment of accessories, and laterally spaced sets of holes 44, 46 (not shown) on the front plate outboard of the side plates for fixing accessories to the front plate.

The basic frame can be seen to consist of only seven elements: four plates forming a body, a handle, and two wheels. Assembly-welding the plates together reduces these elements to a total of four elements, none of which requires particular skill or expense in fabrication; when shipped knocked-down the frame can be set up in very little time by fixing nuts on only four bolts.

FIG. 2 illustrates the frame 10 with an ice-scraper blade 48 fixed across the front plate 22 by bolts 50 with the cutting edge 48a protruding below the front plate. Close coupling in this manner provides maximum support for the heavy work of ice scraping. The rearwardly-upwardly sloping center plate 28 bounded on the ends by the side plates 24, 26 provides an ideal surface for holding weights such as concrete blocks set on the frame to force the scraper down, and sand or salt for distribution on scraped or on icy surfaces. Weights are easily transported to the site to be cleared, rolling the unit on the wheels, and then weigh downward on the ice scraping blade when the handle is raised slightly, lifting the wheels and resting all the weight on the cutting edge. The wheel height adjustment using selected holes 38 provides an effective push angle for an operator of any height and permits using wheels of various sizes if desired. Reversing the blade permits scraping by drawing the unit toward the operator, when desired.

Attachment of the ice-scraping blade is made easier by the outboard location of the blade attachment holes 44, 46 providing ready access for bolting.

FIG. 3 illustrates in top plan view the frame 10 with a diagonal, arcuate-section snow removal blade 52 affixed to the front plate by short and long struts 54, 56 extending rearwardly from the blade and terminating in outward flanges 54a, 56a bolted as at 50 through the front plate outboard of the side plates. Depth of scraping is regulatable by the height at which the handle is held, and the wheels 18, 20 track just inboard of the path cleared in snow by the effective blade width and tend to stabilize against the snow at the sides of the cleared path, preventing sideslipping of the unit when forced ahead.

Sand, leaves, and loose earth can be plowed aside in the same manner as snow, and weights can be loaded on as described before, if desired in heavy going.

FIG. 4 shows a "V" plow blade 58 for snow or other materials, which has a pair of outward turned clips 60 at the sides for attaching it in the same manner as the diagonal blade. Width of the front plate is greater than the span across the wheels so that material plowed tends to be shunted outward, preventing it from piling up ahead of the wheels.

FIG. 5 illustrates a transverse concave scoop blade 62 equal in width to the front plate and which can be fixed on the front plate by bolting as described, the rearward struts 64 from the blade extending the lower edge outward and below the lower edge of the front plate.

The frame handle has a clip 66 for mounting a flashlight 68 above it and aligned to illuminate the area being worked.

FIG. 6 illustrates the frame 10 with a rake blade 70, which may be of steel or may be of plastic. Leaves pushed into a pile may be baled or bagged and loaded on the unit for transport. Stones may be raked by pulling the unit over cultivated land and may be loaded aboard the unit for transport. The rearwardly-upward slope of the center plate 28 (see First Figure) makes it feasible to draw stones into a pile beneath the unit and then freely and without hangup, push the unit forward for access to the stone pile. Together with the center plate slope, the clean fore-and-aft line of the handle, the stub-axles at the side, and the side plate partially shielding the wheels also help prevent hangups, regardless of what material—stones, sand, leaves, snow, ice, or other—is being worked by drawing the unit, and also when the unit is being pushed.

FIG. 7 illustrates a rubber or plastic squeegee 72 which mounts to the lower edge of the front plate by bolts through the squeegee. The squeegee may but need not have an integral metal reinforcing strip across it at the top, and in any case is most useful for clearing water, mud and the like from drives, sidewalks, cement floors and roadways. For example, service station aprons can be quickly and effectively cleaned by hosing down and squeeging with the unit. It is important to note that squeegee pressure can be instantly varied when required, as at irregularities such as expansion joints in cement, by changing the angle of the handle. Water buckets, soap, solvents and the like can be carried on the unit, ready for use as needed.

FIG. 8 illustrates embodiment 800 of the frame to which a scoop 874 is attached to the front plate 822 by bolts through the scoop back 874a. Scoop sides 874b taper down forwardly from the back plate and reinforce the scoop horizontal plate 874c. Large loads of material such as leaves, sawdust and the like can be picked up and carried with little effort. Moderate loads of sand, coal, stone or similar material can easily be picked up and transported in similar manner, without undue strain, in the pan type body.

Another feature shown in this embodiment, which can be used with the other embodiment, is a variable-leverage handle 836. The handle comprises telescoping first and second tubes 836a, 836b, with evenly spaced holes 876 in matched series through each. Bolt and wingnuts attachments 878 through the holes permit the handle to be lengthened or shortened to provide greater or less leverage and ground clearance as desired, the ground clearance feature being adjustable in co-action with ground clearance adjustment of the wheel axle attachments to the frame.

Also visible in this embodiment are paired sockets 880, 882 which may be provided in any embodiment. The sockets are lengths of pipe respectively welded to the frame side plates and front plate along the outside of the juncture of these plates. The sockets may be employed in the manner indicated in the next Figure.

FIG. 9 indicates in an embodiment 900 how each socket 980, 982 is engaged by a downward protrusion 984a, 986a, of respective hose-reel stand legs 984, 986, to support a hose-reel 988 above the front plate of the unit. A brush 990 (or a squeegee) bolted to the front plate and extending below the lower edge may advantageously be used in flush-and brush operations. With a hose connection 992 screwed-on to a faucet the unit may be pushed to a remote position, automatically un-reeling the hose, and then re-reeling the hose may be used to draw the unit back to the faucet, or alternatively the hose may be disconnected from the faucet for re-reeling.

FIG. 10 illustrates an embodiment 1000 having a forward scraper blade 1062 pivotal about a horizontal axis defined by paired arms 1054, 1056, extending rearwardly from the blade and terminating at respective pivots 1094, 1096 in the side plates.

A cable 1098 fixed at an eyebolt 10100 in the rear center of the forward blade runs upwardly over the edge of the front plate 1022 of the frame of the unit and above the handle to a reel assembly 10102 fixed to the handle and having a crank 10104 and ratchet 10106. By operating the reel assembly, the operator can vertically pivot the blade both to set the working level, and to reel it from the work, when desired.

FIG. 11 shows a forward rake assembly 1170 of steel, pivotally mounted to the side plates in similar manner to that shown in the previous Figure, by elements 1154, 1156 and 1194, 1196 permitting the rake to be remotely lowered and raised as required for the material being rake, by cable 1198 and reel assembly 11102.

FIG. 12 shows a forward scoop assembly 1274 pivotally mounted to the side plates in similar manner to that just described, permitting the scoop to be remotely lowered and raised independently of handle angle by cable 1298 attached to the scoop assembly and to reel assembly 12102, for loading and transporting material. When the cable is slack, the scoop rides freely over obstacles and seeks its own level, as to the previous two embodiments.

FIG. 13 illustrates a heavy-load embodiment 1300 in which the frame is provided with a reel assembly 13102 which in turn by cable 1398 draws an angle-plate assembly 13108. The angle plate assembly includes a horizontal generally rectangular plate 13108 integrally fixed at the forward edge to an upright plate 13108b. Eyelet 13110 at the rear edge of the horizontal plate 13108a fairleads twin cables 1398a, 1398b from the reel to respective upper corners of the upright plate.

In operation, the angle plate assembly is placed on the ground forward of the unit, with the cables slack. A load, such as one or more garbage cans 13112 is then slid onto the horizontal plate. The handle of the frame is then raised somewhat and the reel cranked, raising the cables to the load containing or taut position. Continued cranking brings the load aboard to the position illustrated, contained by the cables and the upright plate. If desired, the handle may be used as a lever, raising it to produce cable slack, reeling, then pressing down the handle, and repeating the process. To offload, the handle of the frame is raised to a high angle, the cable is slacked, permitting the loaded angle plate to slide off the forward part of the frame, and the frame is then withdrawn rearwardly, permitting the horizontal plate 13019a to settle flat on the ground, eased by the cable, if desired. Extremely heavy loads can be handled in this manner with little effort and without danger.

FIG. 14 shows an embodiment 1400 with a plow comprising a share 14114 bolted at the lower apex of a triangular strut 14116 which in turn bolts through the base member 14116a of the triangular strut to the handle and center plate, preferably using the handle-attachment provisions. The wheels 1418 shown, may be raised or lowered to set the depth of cut as indicated by the phantom line at 1418' and the handle may be raised or lowered to set the angle of cut. The triangular strut may be reversed on the two-bolt attachment, positioning it for draw-plowing as indicated by the phantom line 14114'. The frame may be loaded as previously described, if required for heavy plowing. In any case, it is apparent that pumping the plow handle up and down, rocking the unit on the wheels, while maintaining only moderate pressure on the plowshare, will effectively break ground. Coupling the plow through the handle and the center plate provides strong, rigid attachment with direct load transfer.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A multi-purpose wheeled tool comprising: a body having: a laterally spaced pair of side plates, a rearwardly extending center plate fixed between the side plates, a generally upright front plate fixed transversely across and in front of the centerplate and side plates, a pair of wheels, means for rotatively mounting each wheel rearwardly in a respective side plate in height adjustable relation thereto, a handle, means fixing the handle in straight relation along and rearwardly protrusive from, the center plate, a plurality of accessory members for use in turn in material working and the like in combination with the body, and means including plural laterally spaced attachment means for detachably attaching in turn the plurality of accessor members to the body.

2. A multi-purpose wheeled tool as recited in claim 1, means for securely holding weights upon said body and for clearing, when the multi-purpose wheeled tool is pushed forward, any material which may be piled up beneath the body when the multi-purpose wheeled tool is drawn rearwardly, including: the center plate angled upwardly in the body toward the rear, relative to the upright front plate.

3. A multi-purpose wheeled tool as recited in claim 2, the means for rotatably mounting all said wheels including: each side plate having a plurality of vertically spaced axle holes therein, a respective stub axle detachably affixing each wheel in a said axle hole in a respective side plate, said center plate supporting the side plates and having a trailing edge, and means providing clear access from above the center plate trailing edge to each said stub axle detachable affixation comprising the portion of each side plate containing said axle holes being rearward of the center plate trailing edge.

4. A multi-purpose wheeled tool as recited in claim 3, the means for detachable attaching including the front plate laterally protrusive at each end thereof past the side plates and at least as far as the wheels protrude laterally and having at least one of said means for detachably attaching at each said protrusive end.

5. A multi-purpose wheeled tool as recited in claim 4, and a said accessory member held directly to the front plate by said means for detachably attaching and having a lower edge thereof extending below the front plate as a scraper.

6. A multi-purpose wheeled tool as recited in claim 5, the accessory member having means for reversing, including planar front and rear surfaces and having a contour at the bottom thereof for engaging and moving materials relative to the multi-purpose wheeled tool, said contour forming a cutting edge positionable for scraping ice when pushed and, when reversed, for scraping ice when drawn.

7. A multi-purpose wheeled tool as recited in claim 1, one of said plurality of accessory numbers comprising an arcuate-section snow removal blade, and said attachment means diagonally affixing the arcuate-section snow removal blade to the front plate.

8. A multi-purpose wheeled tool as recited in claim 7, the attachment means including a short strut and a long strut, all said struts extending rearwardly from the blade and terminating in respective flanges bolted through the front plate.

9. A multi-purpose wheeled tool as recited in claim 1, one of said plurality of accessory members comprising a V plow blade for snow or the like.

10. A multi-purpose wheeled tool as recited in claim 1, one of said plurality of accessory members comprising a rake blade.

11. A multi-purpose wheeled tool as recited in claim 1, one of said plurality of accessory members comprising a scoop.

12. A multi-purpose wheeled tool as recited in claim 11, said scoop having sides tapering down forwardly from the black plate.

13. A multi-purpose wheeled tool as recited in claim 11, said handle having variable-leverage adjustment comprising telescoping first and second tubes and means for attaching first and second telescoping tubes in different telescoping positions.

14. A multi-purpose wheeled tool as recited in claim 11, and a pair of sockets for mounting accessories proximate the front plate; a respective socket of each pair of sockets being attached to each side plate and the front plate along the outside of the juncture of each said side plate and the front plate.

* * * * *